US007109858B2

United States Patent
Dernier et al.

(10) Patent No.: US 7,109,858 B2
(45) Date of Patent: Sep. 19, 2006

(54) METHOD AND SYSTEM FOR EFFICIENTLY REGULATING DATA TRANSMISSIONS

(75) Inventors: William Phillip Dernier, Indianapolis, IN (US); Thomas Charles Clifford, Indianapolis, IN (US)

(73) Assignee: Thomas Licensing, Boulogne-Billancourt (FR)

( * ) Notice: Subject to any disclaimer, the term of this patent is extended or adjusted under 35 U.S.C. 154(b) by 265 days.

(21) Appl. No.: 10/485,026

(22) PCT Filed: Jul. 12, 2002

(86) PCT No.: PCT/US02/22133

§ 371 (c)(1),
(2), (4) Date: Jan. 23, 2004

(87) PCT Pub. No.: WO03/010911

PCT Pub. Date: Feb. 6, 2003

(65) Prior Publication Data

US 2004/0178905 A1 Sep. 16, 2004

Related U.S. Application Data

(60) Provisional application No. 60/307,832, filed on Jul. 25, 2001.

(51) Int. Cl.
*G08B 23/00* (2006.01)
(52) U.S. Cl. .................................... 340/500; 340/588
(58) Field of Classification Search ............... 340/500, 340/585, 588, 506, 539.1, 455, 636.1, 7.32; 702/188
See application file for complete search history.

(56) References Cited

U.S. PATENT DOCUMENTS

| 4,517,468 | A | | 5/1985 | Kemper et al. ............... 290/52 |
|---|---|---|---|---|
| 5,282,685 | A | * | 2/1994 | Koegler ...................... 374/172 |
| 5,657,398 | A | | 8/1997 | Guilak ........................ 382/232 |
| 5,900,801 | A | * | 5/1999 | Heagle et al. ......... 340/286.09 |
| 6,668,240 | B1 | * | 12/2003 | Singh et al. ................. 702/188 |
| 2002/0161545 | A1 | * | 10/2002 | Starling et al. ............. 702/130 |
| 2003/0037554 | A1 | * | 2/2003 | Gatling et al. ................ 62/156 |

* cited by examiner

*Primary Examiner*—Phung T. Nguyen
(74) *Attorney, Agent, or Firm*—Joseph J. Laks; Robert B. Levy; Joseph J. Kolodka

(57) ABSTRACT

A remote device or module sends data to a base station when the change in data from the last transmission exceeds a predetermined threshold. The invention also allows for transmission at a minimal specific time interval. Additionally, the device allows for transmissions based on alarm or alerting conditions.

18 Claims, 3 Drawing Sheets

METHOD AND SYSTEM FOR EFFICIENTLY REGULATING DATA TRANSMISSIONS

This application claims the benefit under 35 U.S.C. § 365 of International Application PCT/US02/22133 filed Jul. 12, 2002, which claims the benefit of U.S. Provisional Application No. 60/307,832 filed Jul. 25, 2001.

BACKGROUND OF THE INVENTION

1. Field of the Invention

The present invention relates to remote transmission of data, and, more particularly, to methods and systems for remote transmission of data to conserve energy.

2. Discussion of Related Art

Operation of battery-powered remote transmitters that send periodic or continuous data transmissions have a relatively short time between battery replacements. Typical operational life for batteries used in these devices is six months to one year.

Battery replacement cost can be substantial considering not only the cost to replace batteries but also the labor cost involved. This is particularly true where there are numerous such devices at various remote locations. In this case, a person would have to go to each remote location, replace the batteries, test the equipment to make sure that it is properly functioning, and then return back.

Additionally, because conventional data transmitting devices require so much energy, relatively large size batteries are typically needed to power a unit for long periods of time. This presents a problem to designers where the battery is too large for the desired housing. If a smaller battery could be used, the device could be made physically smaller and lighter. In turn, a smaller device would also be less expensive to manufacture and could therefore be more competitively priced.

SUMMARY OF THE INVENTION

A method for efficiently transmitting data from a remote location includes comparing a first data sample with a second data sample, determining whether a transmit condition exists, and transmitting data only if it does. For example, data may be transmitted when the data samples differ by a predetermined amount. In various other embodiments, transmission can also occur at a minimal specific time interval. Additionally, the device can be configured to allow for transmissions based on alarm and/or alerting conditions.

BRIEF DESCRIPTION OF THE DRAWINGS

Preferred embodiments of the present invention will be described below in more detail, with reference to the accompanying drawings.

DESCRIPTION OF PREFERRED EMBODIMENTS

Figure 1:
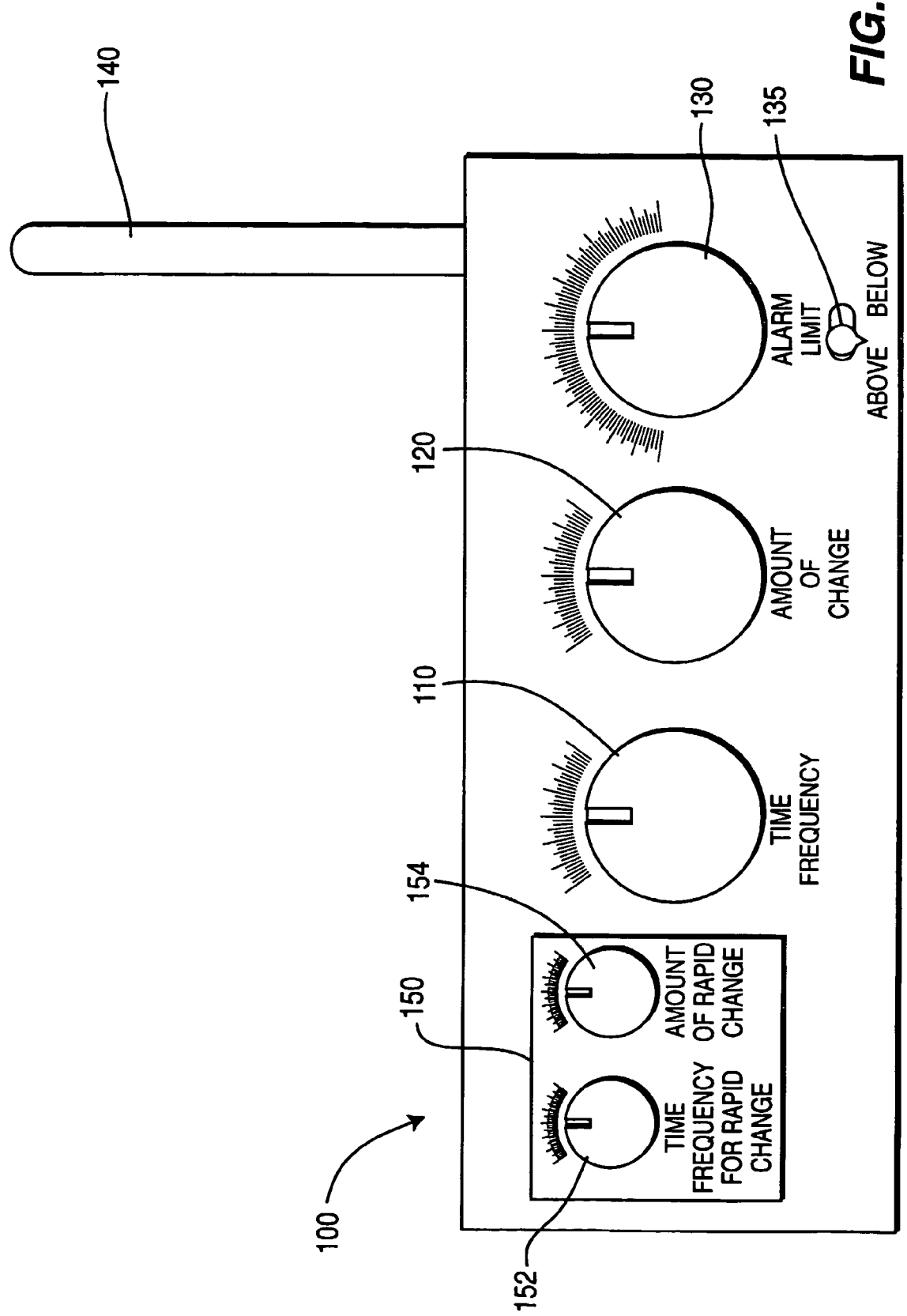
FIG. 1 illustrates an exemplary control interface for setting transmission frequency and alarm/alert conditions.

According to various embodiments of the present invention, a remote device or module sends data to a base unit when the change in data from the previous transmission exceeds a predetermined threshold. The present invention also allows for transmission at a minimal specific time interval. Additionally, the device allows for transmission based on alarm and/or alerting conditions.

To facilitate a clear understanding of the present invention, illustrative examples are provided herein which describe certain aspects of the invention. For instance, many of the examples used herein relate to a temperature sensing device. However, it is to be appreciated that the present invention is not limited to temperature sensing or even weather-related applications. It is to be appreciated that the present invention applies equally to other situations in which data is to be remotely transmitted and energy can be conserved by setting the conditions under which a transmission occurs. One skilled in the art would readily appreciate that applications for this invention abound, and include not only remote transmission of various physical measurement data (e.g., seismic data, humidity data, barometric pressure data) but also transmission of other types of information such as stock market quotes, sports scores, traffic data, etc. So long as it is desirable to limit the transmission of data based on certain conditions, the teachings of the present invention may be applicable.

It is to be further understood that the control functions of the present invention may be implemented in various forms of hardware, software, firmware, special purpose processors, or a combination thereof. In one embodiment, the present invention may be implemented in embedded software as an application program tangibly embodied on a program storage device. The application program may be executed by a machine comprising any suitable architecture. Preferably, the machine is implemented on a microprocessor platform having hardware such as one or more central processing units (CPU), a random access memory (RAM), and input/output (I/O) interface(s). However, in other embodiments, a special purpose processor, a ASIC or other integrated circuit, a digital signal processor, a hard wired electronic or logic circuit such as a discrete element circuit, a programmable logic device such as a PLD, PLA, FPGA or PAL, may alternatively be used, without departing from the spirit and scope of the present invention.

In various exemplary embodiments, the microprocessor platform also includes an operating system and micro instruction code. The various processes and functions described herein may either be part of the micro instruction code or part of the application program (or a combination thereof) which is executed via the operating system. In addition, various other peripheral devices may be connected to the microprocessor platform such as an additional storage device.

It is to be further understood that, because some of the constituent system components and method steps depicted in the accompanying figures may be implemented in software, the actual connections between the system components (or process steps) may differ depending upon the manner in which the present invention is programmed. Given the teachings of the present invention provided herein, one of ordinary skill in the related art will be able to contemplate these and similar implementations or configurations of the present invention.

Referring to FIG. 1, a control interface 100 includes a time frequency dial 110, a change amount dial 120, an alarm limit dial 130, an alarm switch 135, and an antenna 140. Furthermore, the control interface 100 includes an alert condition setting interface 150 which includes a rapid change time frequency dial 152 and a rapid change amount dial 154.

The time frequency dial 110 can be used to set the minimal time interval for each transmission. For example, it may be desirable to transmit data at least once an hour regardless of whether a condition has changed. The change amount dial 120 can be used to set the desired change amount that will cause a transmission to occur. For example, it may be desirable to transmit if a temperature has changed by five degrees. The alarm limit dial 130 can be used to set an alarm condition. The alarm limit dial 130 may be used in conjunction with the alarm switch 135, which allows the user to specify whether the alarm is to be signaled when the alarm limit is above or below the alarm limit value. For instance, one user might set their alarm limit dial 130 to 0° C. (32° F.) and alarm switch 135 to "above" for protection of meat in their freezer while another user might set their alarm limit dial 130 at 0° C. and alarm switch 135 at "below" to be alerted to their tulip garden freezing.

In addition, it may be desirable to have an alarm sent to the base station if the amount of change has increased (or decreased) more than a specified amount during a particular time period. The amount of change can be set using the rapid change amount dial 154 and the time period can be set using the rapid change time frequency dial 152. For example, it may be desirable to be alerted whenever the temperature drops more than ten degrees within a two-hour period.

To illustrate certain concepts, several different transmission methods are compared in Table 1. The data shown was recorded on an hourly basis by a weather station in Indianapolis, Ind., on Apr. 8, 2001. As indicated, when the temperature is only recorded once every hour, large changes in temperature in a given hour are missed and accuracy is lost. In the example, the invention could be set to transmit data any time the temperature changes by one degree. If a certain time period (e.g., 60 minutes) elapses without a change in temperature, the unit also could be set to transmit the temperature. In this case, in a twenty four hour time period, the invention would have transmitted 46 times. This is compared to a consumer unit that transmits every thirty seconds. This would require 2,880 transmissions. The information in Table 1 illustrates how accuracy can be maintained while only transmitting for preset parameters. Advantageously, less power is consumed from the batteries and thus a longer battery life is obtained.

While the exemplary control interface 100 shown in FIG. 1 uses several knobs, it should be appreciated that the selection of various information can be accommodated using a variety of other types of devices, such as any number of graphical user interface selection devices, check boxes, buttons, list boxes, pop-up or pop-down marks, text entry boxes, and LCD displays, without departing from the scope or spirit of the present invention.

TABLE 1

| Time of Day | Actual Temperature | TRANSMISSIONS | | |
|---|---|---|---|---|
| | | Hourly | 1 Degree increment or hourly | Periodic (every 30 seconds) |
| 12:00 AM | 74 | | | |
| 1:00 AM | 73 | 1 | 1 | 120 |
| 2:00 AM | 72 | 1 | 1 | 120 |
| 3:00 AM | 72 | 1 | 1 | 120 |
| 4:00 AM | 70 | 1 | 2 | 120 |
| 5:00 AM | 68 | 1 | 2 | 120 |
| 6:00 AM | 64 | 1 | 4 | 120 |
| 7:00 AM | 66 | 1 | 2 | 120 |
| 8:00 AM | 70 | 1 | 4 | 120 |
| 9:00 AM | 72 | 1 | 2 | 120 |
| 10:00 AM | 75 | 1 | 3 | 120 |
| 11:00 AM | 77 | 1 | 2 | 120 |
| 12:00 PM | 81 | 1 | 4 | 120 |
| 1:00 PM | 81 | 1 | 1 | 120 |
| 2:00 PM | 81 | 1 | 1 | 120 |
| 3:00 PM | 82 | 1 | 1 | 120 |
| 4:00 PM | 81 | 1 | 1 | 120 |
| 5:00 PM | 81 | 1 | 1 | 120 |
| 6:00 PM | 79 | 1 | 2 | 120 |
| 7:00 PM | 75 | 1 | 4 | 120 |
| 8:00 PM | 73 | 1 | 2 | 120 |
| 9:00 PM | 73 | 1 | 1 | 120 |
| 10:00 PM | 72 | 1 | 1 | 120 |
| 11:00 PM | 72 | 1 | 1 | 120 |
| 12:00 PM | 70 | 1 | 2 | 120 |
| | | 24 | 46 | 2,880 |

Figure 2:
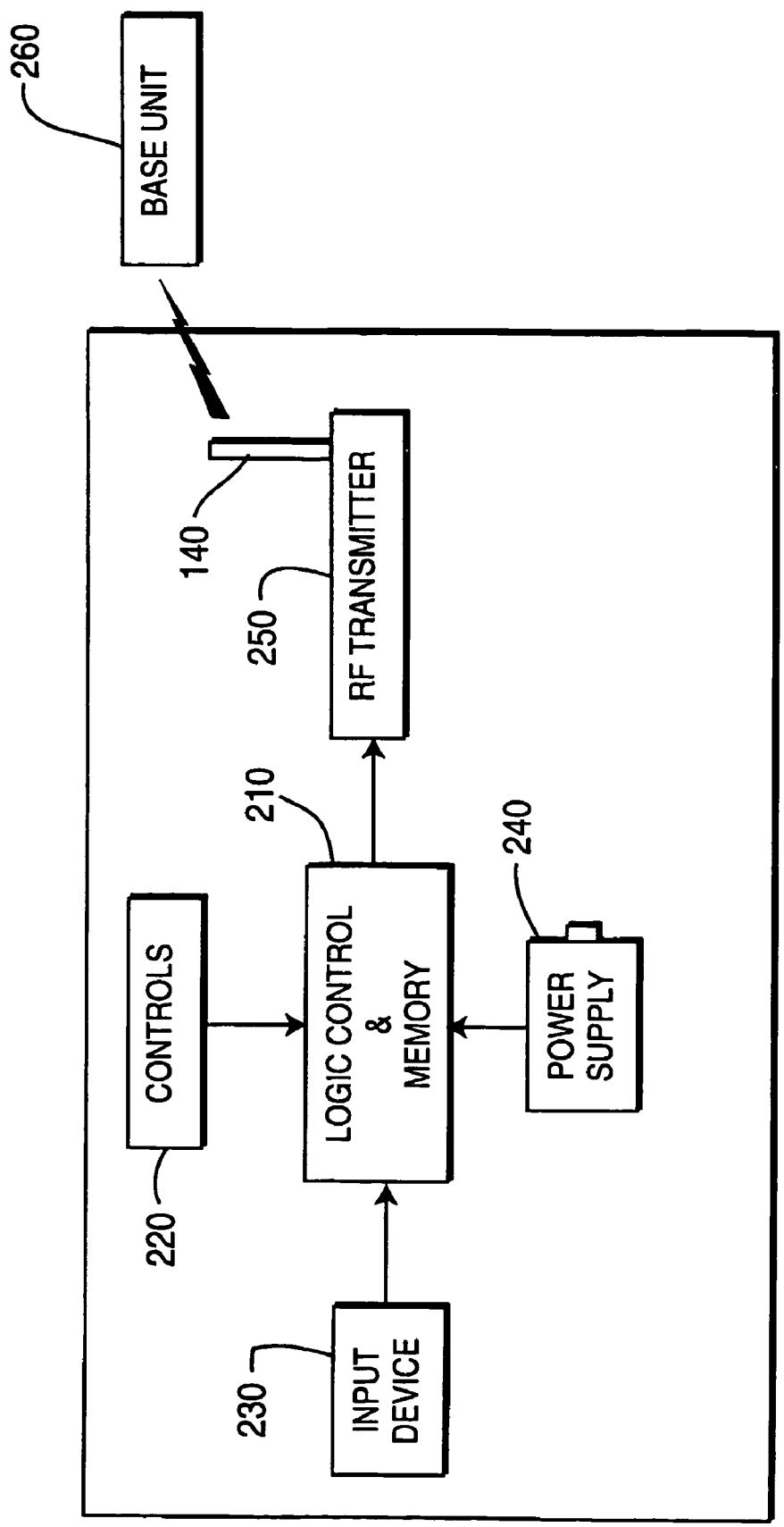
FIG. 2 is a block diagram of an exemplary system architecture for regulating data transmission according to an embodiment of the present invention.

FIG. 2 shows a block diagram illustrating an exemplary system architecture for the present invention. An input device 230, controls device 220, and a power supply (battery) 240 are operatively connected to a logic control and memory unit 210. The logic control and memory unit 210 is operatively connected to a radio frequency (RF) transmitter which uses the antenna 140 to send information to a base unit 260.

In operation, the input device 230 periodically or continuously receives information from one or more sensor (not shown). For example, the input device 230 may receive temperature information that is obtained from a thermometer device. The logic control and memory unit 210 then determines whether to transmit data. This may involve, for example, determining whether the temperature has increased (or decreased) more than a specified amount. The present invention also may be configured to allow for transmission at a minimal specific time interval. Additionally, the device may be configured to allow for transmission based on alarm or alerting conditions.

The change amount may be entered and adjusted using the controls device 220 (for example, as depicted in FIG. 1) and control Information corresponding to the values may be stored in the memory portion of the logic and memory unit 210. If the appropriate condition is met, the logic control and memory unit 210 can cause the RF transmitter 250 to transmit the data to the base station 260. The data that is transmitted may include a data value (e.g., temperature) and/or a message or code indicating an alert/alarm condition. The alert/alarm may be triggered by either the measured value exceeding a threshold value or increasing or decreasing more than a predetermined amount.

Figure 3:
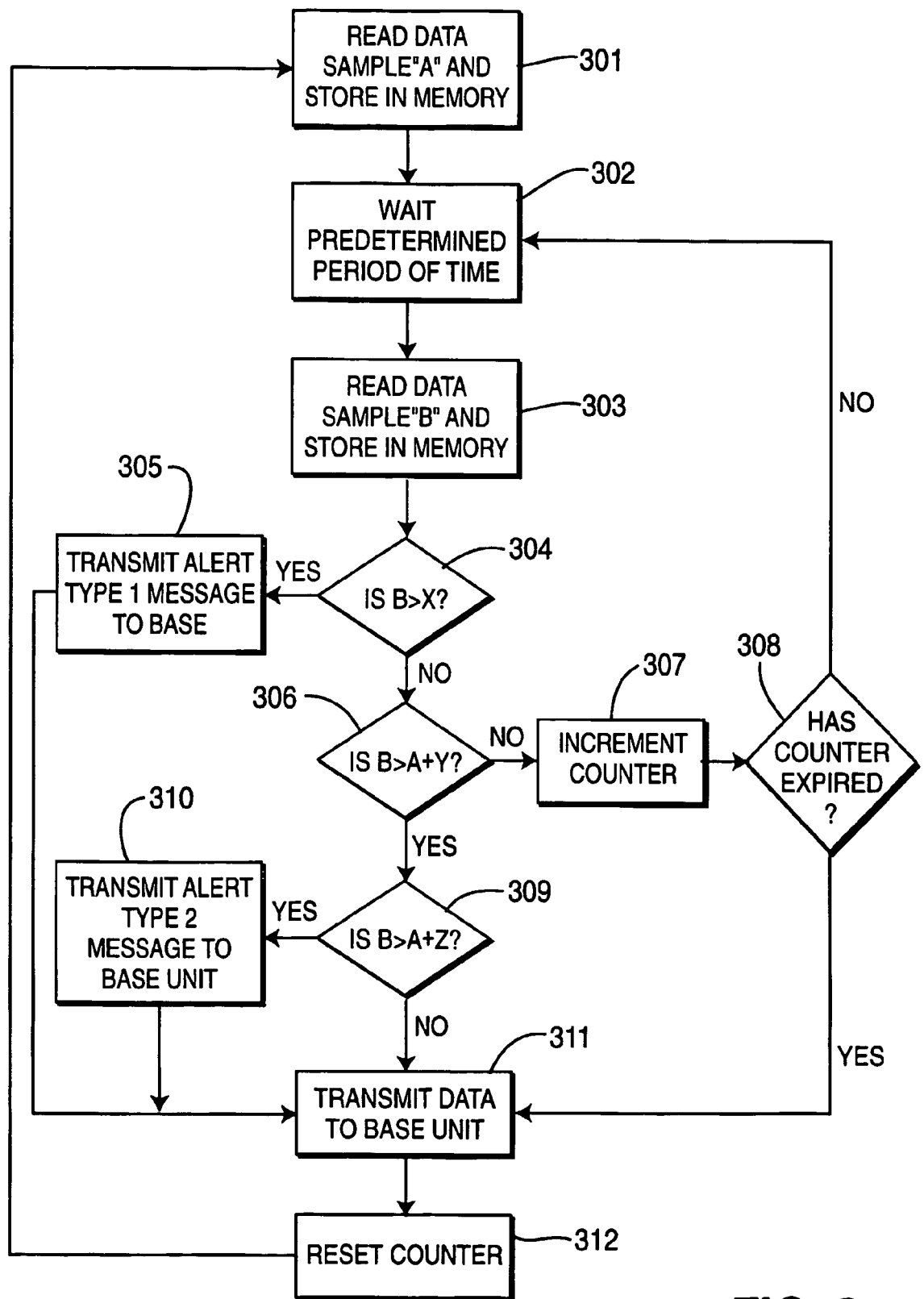
FIG. 3 is a flow chart of an exemplary method for regulating data transmission according to an embodiment of the present invention

As shown in FIG. 3, data from a sensor or other data source (sample "A") can be read from an input device and stored in memory (301). After waiting a predetermined length of time (302), another reading may be taken (sample "B") (303). The time interval could be preset or user selectable, depending on the particular application. Sample "B" would then be compared to a value "X", where X is a preset value that, when exceeded, causes an alarm message (type 1 message) to be transmitted (304). If the alarm conditions are met, the unit transmits a message along with the current data (305). Although the flowchart shown herein illustrates the case of sending an alarm if the sample value B is exceeded by an X amount, it should be appreciated that the present invention could be set to transmit the alarm if the sample B value was below the X amount.

If the conditions are not met, sample "B" is then compared to A+Y, where Y is the change in value that causes a transmission (306). Y is also a preset or user selectable value (which may be a positive or negative value). If the condition is not met, then a counter is incremented (307). The counter provides a means to transmit data after a specified time interval if there has been no transmission due to a change in data (308). If the "X+Y" condition is met, then sample B is checked against A+Z, where Z represents a large change in data that requires a special alert (type 2) (309). If the "A+Z" condition is not met, then the data is transmitted without a type 1 or a type 2 message (311). Otherwise, a type 2 message is transmitted (310). Once data and/or messages are transmitted the counter is reset (312).

Having described embodiments for a method and system for efficiently regulating data transmissions, it is noted that modification and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularly required by the patent laws, what is claimed and desired protected by Letters Patent is set forth in the appended claims.

The invention claimed is:

1. A method for efficiently transmitting data from a remote location to a base station, comprising the steps of:
   obtaining a first data sample A and a second data sample B;
   transmitting the second data sample B and a first type alarm message to the base station if it is determined that the second data sample B is above a value X; and
   transmitting a second type alarm message and the second data sample B to the base station if it is determined that the second data sample B is above additional values.

2. The method of claim 1, further comprising the step of transmitting the second data sample if a predetermined length of time has elapsed.

3. The method of claim 1, wherein the value X comprises a first alarm limit value.

4. The method of claim 1, further comprising the step of transmitting the first type alarm message if the second data sample is below the value X.

5. The method of claim 1, further comprising the step of resetting a counter following transmission of at least one of the data and alarm messages.

6. The method of claim 1, wherein parameter values used to determine whether a transmit condition exists are entered by a user at the remote location.

7. The method of claim 1, wherein the additional values comprise values (A+Y) and (A+Z).

8. The method of claim 7, wherein the value Y comprises a change in value that causes a transmission.

9. The method of claim 7, wherein the value Z comprises a large change in data that triggers the second type alarm message.

10. The method of claim 1, further comprising the step of transmitting the second type alarm message if the second data sample is below both values (A+Y) and (A+Z).

11. A system for efficiently transmitting data from a remote location to a base station (260), comprising:
   an input device (230) that obtains a first data sample A and a second data sample B;
   a controller (210) that determines whether the second data sample B is above or below a value X and whether the second data sample B is above or below both values (A+Y) and (A+Z); and
   a transmitter (140) that transmits the second data sample B and a first type alarm message to the base station if it is determined that the second data sample B is above or below the value X, and transmits a second type alarm message and the second data sample B to the base station if it is determined that the second data sample B is above or below both values (A+Y) and (A+Z).

12. The system of claim 11, wherein the controller further determines whether a predetermined length of time has elapsed and the transmitter transmits the second data sample if it is determined that the predetermined length of time has elapsed.

13. The system of claim 11, wherein the value X comprises a first alarm limit value.

14. The system of claim 11, wherein the value Y comprises a change in value that causes a transmission.

15. The system of claim 11, wherein the value Z comprises a large change in data that triggers the second type alarm message.

16. The system of claim 11, further including a counter, wherein said counter is reset following transmission of at least one of the data and alarm messages.

17. The system of claim 11, further comprising controls for inputting parameter values used to determine whether a transmit condition exists are entered by a user at the remote location.

18. A method for efficiently transmitting data from a remote location to a base station, comprising the steps of:
   obtaining a first data sample A and a second data sample B;
   transmitting the second data sample B and a first type alarm message to the base station if it is determined that the second data sample B is below a value X; and
   transmitting a second type alarm message and the second data sample B to the base station if it is determined that the second data sample B is below both values (A+Y) and (A+Z).

* * * * *